Dec. 10, 1929. R. B. FAGEOL 1,739,355
TORQUING ARRANGEMENT FOR TANDEM AXLE VEHICLES
Original Filed Nov. 2, 1921 2 Sheets-Sheet 1

Inventor
Rollie B. Fageol
By William A. Strauch
Attorney

Dec. 10, 1929.  R. B. FAGEOL  1,739,355
TORQUING ARRANGEMENT FOR TANDEM AXLE VEHICLES
Original Filed Nov. 2, 1921    2 Sheets—Sheet 2
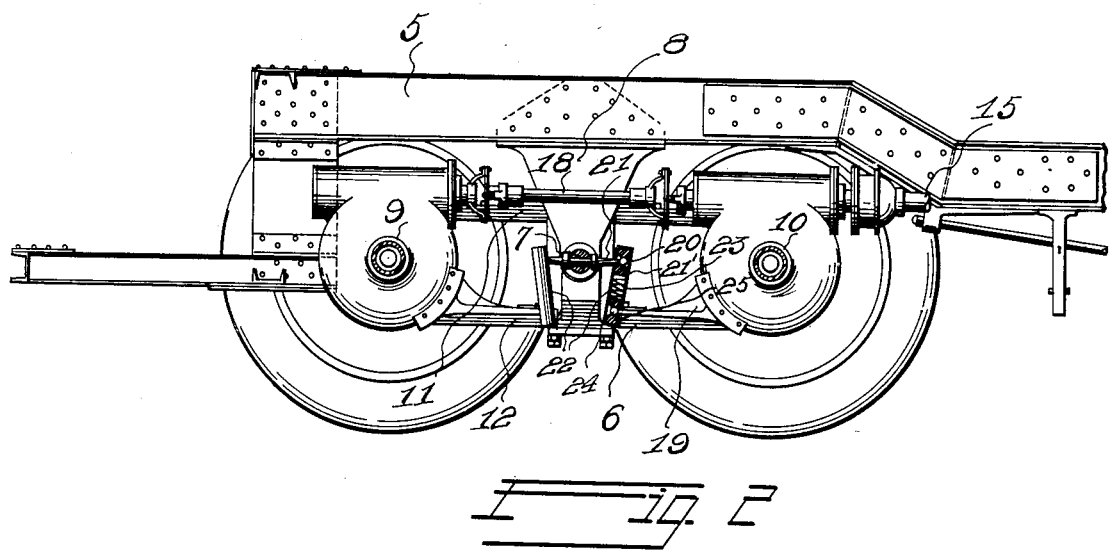
_Fig. 2_
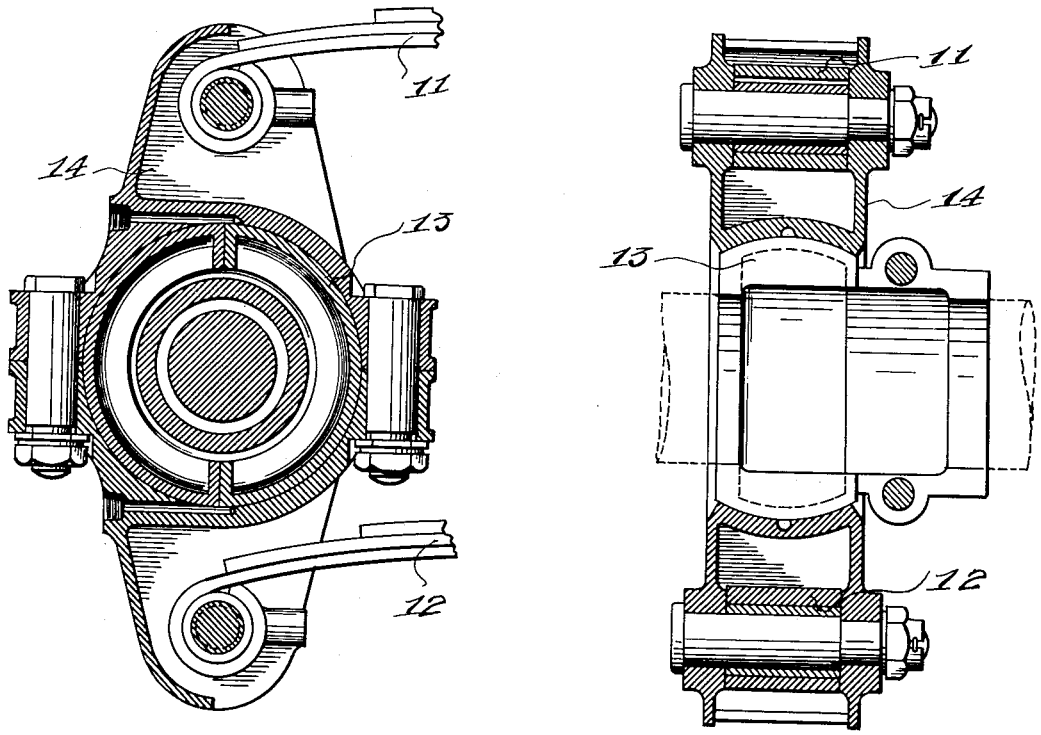
_Fig. 3_   _Fig. 4_
Inventor
Rollie B. Fageol
William A. Strauch
By
Attorney Patented Dec. 10, 1929

1,739,355

UNITED STATES PATENT OFFICE

ROLLIE B. FAGEOL, OF LOS ANGELES, CALIFORNIA, ASSIGNOR TO EIGHT-WHEEL MOTOR VEHICLE COMPANY, A CORPORATION OF CALIFORNIA

TORQUING ARRANGEMENT FOR TANDEM-AXLE VEHICLES

Original application filed November 2, 1921, Serial No. 512,243. Divided and this application filed July 25, 1927. Serial No. 208,369.

This invention relates to motor road vehicles of the type disclosed in my application Serial No. 512,243, filed November 2, 1921 (now Patent Number 1,660,188, granted February 21, 1929), of which this is a division, and that include two driven axles. In such vehicles it is essential, in order that destructive shocks be not transmitted to the frame or to the running gear, that each axle be resiliently connected to the frame and capable of freedom of movement in every direction permitted by said resilient connection. Otherwise, the normal action of the springs is restricted, and shocks are set up which not only cause unsatisfactory riding conditions when the construction is used in busses, but also rapidly destroy the life of the running gear. Moreover, the reactions due to the driving torque must be effectively resisted without restricting the freedom of movement of the axles, if satisfactory operation is to be had.

A primary object of the invention is to provide a multi-wheel vehicle including two driven axles connected to the frame by springs, and in which the driving torque reactions are resisted without substantially interfering with the freedom of movement of the axle in every direction of movement permitted by their resilient connection to the frame.

A further object of the invention is to provide a driven axle construction in which the axles are arranged in tandem, and in which the axles are resiliently connected together and to the frame in a manner permitting substantial pivotal movement of the axles and their springs with reference to the frame, and in which each axle is free to tilt without imposing substantial twisting stresses on the springs, and in which the torque reactions are resisted without substantially restricting the movements just referred to.

A further object of the invention is to provide a torque resisting connection between the housings of tandem arranged driven axles that is rigid in substantially vertical planes but is flexible in directions necessary to permit each axle to freely follow the path of movement of its connection to the spring that resiliently unites it to the frame of the vehicle.

Further objects of the invention will appear as the description of the invention proceeds with reference to the accompanying drawing in which, Figure 1 is a plan view of the rear truck of a vehicle embodying two driven axles.

Figure 2 is a vertical section through the rear truck on the line 2—2 of Figure 1.

Figure 3 is a vertical section through a rear axle showing the spring hanger.

Figure 4 is a vertical section through said hanger on a plane at right angles to that on which Figure 3 was taken.

Like reference characters indicate like parts throughout the several figures.

Figure 1:
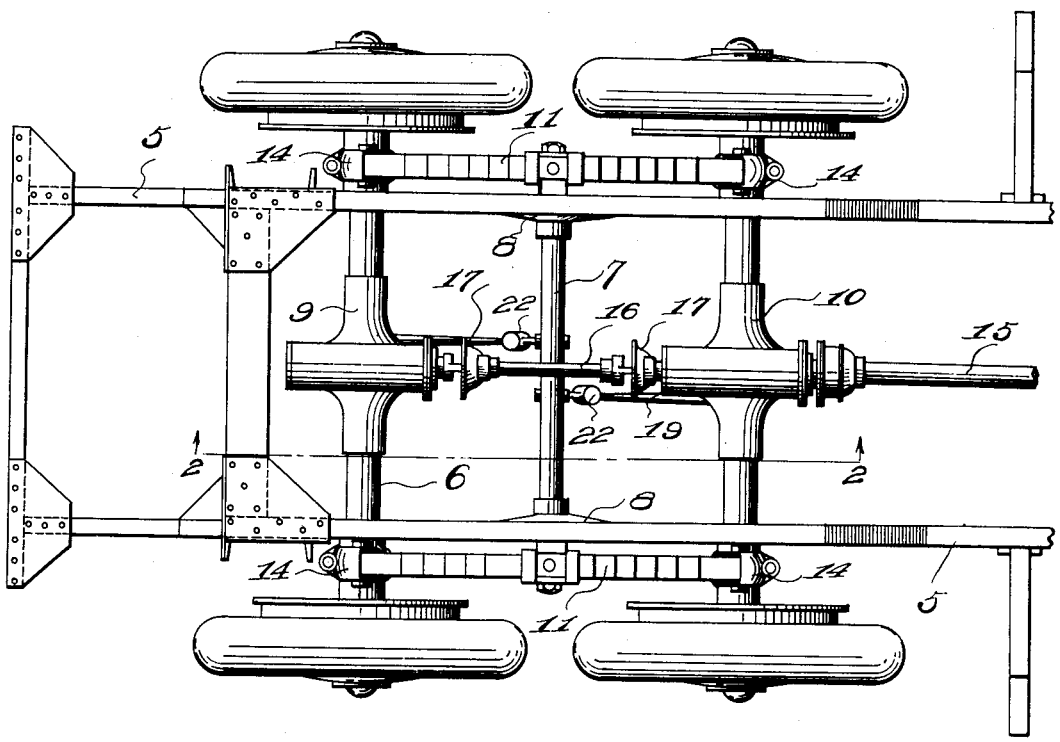

The road vehicle of this invention includes a rear or driving truck consisting of two pairs of wheels, each pair being carried by an axle that is resiliently connected to the frame and the other axle by leaf springs, and in which the assembly of springs and axles here termed a truck, is free to swing about a shaft extending transversely of the vehicle frame.

The vehicle comprises a suitable main frame 5 upon which is mounted the driving motor and the body. Said frame is supported at its rear end on a truck, indicated as a whole by the numeral 6. A transverse shaft 7 supported on brackets 8 projecting downwardly from frame 5, serves to connect truck 6 to the frame.

Truck 6 consists of axle housings 9 and 10 arranged in tandem, each housing having the usual axle sections and differential rotatably mounted therein, and being supported by a pair of wheels to which the axles are rigidly connected in suitable manner to transmit the driving torque to said wheels. Said truck 6 also comprises springs 11 and 12 on each side of said vehicle, the mid portions of which are pivoted on the ends of cross-shaft 7 above referred to. The ends of springs 11 and 12 are secured to the axle housings, as shown in Figures 3 and 4, by securing to each axle housing adjacent its ends a bearing member 13 having a ball external surface. Surrounding said bearing member 13 is a second bearing member 14 connected to springs 11 and 12 and having an internal spherical surface surrounding said ball shaped bearing member 13, the arrangement being such that limited universal movement can take place between the axle housing and the spring hanger. By this arrangement the axles are free to tilt in vertical planes without causing torsional strains to be set up in the springs 11 and 12.

Power is transmitted to drive the vehicle from a shaft 15, including a flexible portion 16 including universal joints 17 and slip joint 18, extending between the housings. The portion 16 permits the axle housings 9 and 10 to approach and recede from each other and also each axle housing to swing freely in substantially vertical planes.

Secured to the front drive axle housing 10 adjacent the center line, is an arm 19, which is flexibly connected with the cross shaft 7. The flexible connection comprises a ball 20, secured to the arm 21 carried by cross shaft 7, and seated in a sliding bearing 21' carried in tube 22. A spring 23 is disposed in said tube to cushion the movement of the tube with respect to said bearing and to normally hold the tube in neutral position. The end of arm 19 is provided with a ball 24 which seats in a fixed bearing 25 in the tube, the two balls 20 and 24 being spaced vertically so that differences in the spread of the axles cause the tube to rock. The rear housing 6 is connected to the cross-shaft 7 in similar manner. The axle housings are thus prevented from rotating except through a very limited angle but may spread apart or assume varying angular relations in substantially vertical planes. Other means may be employed for accomplishing the same result and it is to be understood that I do not limit myself to the specific means shown herein. The present embodiment is to be considered in all respects as illustrative and not restrictive, the scope of the invention being indicated by the appended claims rather than by the foregoing description, and all changes which come within the meaning and range of equivalency of the claims are intended to be embraced therein.

What I claim as my invention is—

1. A road vehicle including a frame, a truck, comprising two axle housings and springs united at their ends to said housings by universal joints and connecting said axle housings together, said truck being arranged to support one end of said frame, and being pivoted to said frame on a transverse axis so that the truck is free to swing as the wheels thereof follow road irregularities, axles in said housings, a drive shaft, means, including flexible shaft sections, to transmit the power of said shaft to said axles, and torque resisting connections arranged to resist the reactions due to the driving torque arranged between said housings, said connections being substantially rigid in substantially vertical planes but flexible endwise and laterally so that the housings can freely approach or recede from each other as the springs deflect, and can freely tilt as the wheels on one side of the vehicle rise or fall with respect to the wheels on the other side thereof.

2. A road vehicle as defined in claim 1, in which the torque connections comprise substantially horizontally extending arms rigidly secured to the housings and other arms extending approximately at right angles to said first named arms and united thereto by universal joints.

3. A road vehicle comprising a frame, a pair of axle housings arranged at one end of said frame, springs resiliently connecting the housings together adjacent both ends thereof, the springs being pivotally attached to said housings and pivotally attached to said frame between their ends, driven axles within said housings, a flexible drive shaft supported in said housings to drive said axles, and devices to resist the reactions tending to rotate said housings due to the driving torque, said devices being arranged substantially centrally of said vehicle, connected between said frame and the said axle housings and being rigid in substantially vertical planes to resist the torque tending to rotate the housings about said axles, but being flexible in substantially horizontal planes and laterally to permit the housings to move as the springs deflect and to permit the housings to tilt as the wheels of the vehicle on one side thereof rise or fall with respect to the wheels on the other side thereof.

4. The combination defined in claim 3 in which the torque resisting connections comprise rigid members extending substantially parallel to each other, one of said members being carried by the frame, and the other by a housing, and a connecting link extending approximately at right angles to said member and connecting the free ends thereof together by joints that are flexible sidewise of said link, and endwise of said members.

5. A road vehicle comprising a frame, a pair of axle housings arranged at one end of said frame, a pair of springs arranged at each side of the vehicle above and below said housings, and connecting said housings together in a manner permitting substantially unrestricted tilting of the housings, means to pivotally connect said springs at each side of the vehicle to said frame, axles carried by said housings, a drive shaft, means to drive said axles, and torque resisting means to transmit the reactions due to the driving torque to the frame comprising a pair of arms connected respectively to said housings and extending toward each other and links connecting the free ends of said arms to said frame, said links extending substantially at right angles to said arms and being connected to said arms and said frame by joints that are flexible laterally, whereby the torque reactions are resisted without substantially restricting the movements of the axles in every direction permitted by their connection to the frame and by the deflection of said springs.

6. A road vehicle as defined in claim 5 in which the axes of the pivotal connections between the housings and springs and between the springs and frame lie substantially in the same horizontal plane.

7. A road vehicle comprising a frame, a pair of axle housings arranged beneath one end of said frame, springs connected to said housings by universal joints and to said frame by pivotal connections, torque resisting connections between said frame and housings, said connections comprising two arms rigidly secured to said axle housings and extending toward each other, and a third arm secured to said frame and spaced above said first named arms, and links connecting the ends of said third arm, respectively, to the free end of said first named arms, the connection between the ends of the arms and the links being by universal joints.

8. The combination defined in claim 7 in which the axes of the pivotal connection between the frame and springs lies substantially in the horizontal plane that includes the axes of the housings.

9. A road vehicle including a frame, a truck supporting one end of said frame, said truck comprising two axle housings, and springs united at their ends to said housings to connect said housings together, said springs being pivoted to said frame on a transverse axis so that the truck is free to swing about said axis as the wheels thereof follow road irregularities, axles in said housings, a pair of wheels supporting each axle and a flexible connection between one of said axles and the frame, said connection including an arm secured to the axle housing adjacent one end, and means supported from said frame and connected to said arm adjacent its other end at a point below the pivot about which said truck swings, whereby the effect on said arm of the swinging movement of said truck about said pivot is minimized.

10. The combination defined in claim 9 in which said flexible connection includes a joint that is rigid in substantially vertical planes but flexible laterally in directions transverse to the length of said connection.

11. A road vehicle including a frame; a truck supporting one end of said frame; said truck comprising two axle housings, and springs united at their ends to said housings to connect said housings together, said springs being pivoted to said frame on a transverse axis so that the truck is free to swing about said axis as the wheels thereof follow road irregularities, axles in said housings, a pair of wheels supporting each axle and a flexible connection between one of said axles and the frame; said connection including an arm secured to the axle housing adjacent one end, and an element pivotally connected to said frame at one end and to said arm adjacent its other end at a point relatively close to the pivot about which said truck swings, whereby the effect on said arm of the swinging movement of said truck about said pivot is minimized.

12. The combination defined in claim 11 in which said flexible connection includes a joint that is rigid in substantially vertical planes but flexible laterally in directions transverse to the length of said connection.

13. In a road vehicle construction, a frame, a truck supporting one end of said frame, said truck comprising a pair of axles, means interconnecting said axles to maintain them in properly spaced relation longitudinally of the frame, a mounting suspended from the frame including means for pivotally receiving and supporting said interconnecting means between the ends of the latter on a transverse axis to permit swinging of said interconnecting means as a unit about said transverse axis, and a torquing device flexibly connected between one of said axles and said mounting.

14. In the construction defined in claim 13, said torquing device being universally connected to said mounting.

15. In a road vehicle construction, a frame, a truck supporting one end of said frame, said truck comprising a pair of axles, means at each side of said frame interconnecting said axles to maintain them in properly spaced relation longitudinally of the frame, means pivotally suspending said interconnecting means from said frame on a transverse axis whereby the truck is free to swing about said axis as the vehicle moves over road irregularities, and torque resisting devices each connected at one end to an axle and at its other end to said suspending means, said devices being flexible to permit unhampered movement of the truck.

16. In a road vehicle construction, a chassis frame, a truck supporting one end of said frame, said truck comprising a pair of tandem axles and apparatus for interconnecting said axles and resiliently mounting them under the frame, said apparatus having a pivotal mounting upon a transverse axis which lies approximately in the horizontal plane of the axles; and flexible torque couplings connected between said axles and points upon said mounting in proximity to said transverse axis whereby the axles and couplings are permitted to have unrestricted movement as said apparatus moves over uneven road surfaces.

17. In a road vehicle construction, a chassis frame, a truck supporting one end of said frame, said truck comprising a pair of axle housings and apparatus interconnecting and resiliently mounting said housings with respect to the frame, said apparatus including a trunnion mounting permitting the axle housings to oscillate about a transverse axis, said transverse axis being disposed substantially in the horizontal plane that contains the axes of said housings, driving axles arranged in said housings and wheels mounted upon said axles, a drive shaft flexibly connected with the forward driven axle, a second driving shaft flexibly interconnecting said axles; and mechanism for resisting strain and torque reactions, said mechanism comprising arms rigidly mounted upon the axle housings, pins rigidly carried by the trunnion mounting and having ends projecting to points adjacent said transverse axis, and means flexibly interconnecting said rigid arms with said ends.

18. In a road vehicle construction, a frame and a truck supporting one end of said frame; said truck comprising a pair of axles, means interconnecting said axles to maintain them in properly spaced relation longitudinally of the frame, said interconnecting means including devices carried by said axles to permit them to have a limited universal movement, a mounting suspended from the frame between said axles to provide a pivotal support for the central portion of said interconnecting means, and a torquing device connected between one of said axles and said mounting.

In testimony whereof I affix my signature.
ROLLIE B. FAGEOL.